US009122550B2

(12) United States Patent
Hsiao

(10) Patent No.: US 9,122,550 B2
(45) Date of Patent: Sep. 1, 2015

(54) METHOD AND DEVICE FOR PROGRAM INSTALLATION

(75) Inventor: Ting-Chih Hsiao, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 513 days.

(21) Appl. No.: 13/075,166

(22) Filed: Mar. 29, 2011

(65) Prior Publication Data

US 2011/0289491 A1    Nov. 24, 2011

(30) Foreign Application Priority Data

May 20, 2010   (TW) .............................. 99116098 A

(51) Int. Cl.
*G06F 9/445* (2006.01)
*G06F 9/44* (2006.01)
*G06F 9/45* (2006.01)

(52) U.S. Cl.
CPC .. *G06F 8/61* (2013.01); *G06F 8/41* (2013.01); *G06F 8/71* (2013.01)

(58) Field of Classification Search
None
See application file for complete search history.

(56) References Cited

U.S. PATENT DOCUMENTS

| 6,199,204 | B1* | 3/2001 | Donohue | 717/178 |
| 6,381,742 | B2* | 4/2002 | Forbes et al. | 717/176 |
| 8,543,998 | B2* | 9/2013 | Barringer | 717/175 |
| 2001/0029605 | A1* | 10/2001 | Forbes et al. | 717/11 |
| 2004/0015953 | A1* | 1/2004 | Vincent | 717/173 |
| 2004/0250247 | A1* | 12/2004 | Deeths et al. | 717/175 |
| 2009/0064135 | A1* | 3/2009 | Jimmerson | 717/178 |

FOREIGN PATENT DOCUMENTS

| CN | 1485732 A | 3/2004 |
| TW | 200411559 | 7/2004 |

OTHER PUBLICATIONS

Anonymous, "Installing Wine from Source," Wine HQ [online], 2010 [retrieved Jul. 18, 2013], Retrieved from Internet: <http://web.archive.org/web/20100227194828/http://www.winehq.org/docs/wineusr-guide/installing-wine-source>, pp. 1-2.*
Mackenzie, D., et al., Automake, Gnu.org [online], 2009 [retrieved Jul. 22, 2013], Retrieved from Internet: <http://web.archive.org/web/20100514090735/http://www.gnu.org/software/autoconf/manual/autoconf.pdf>, pp. 1-370.*
Stallman, R., et al., GNU Make, Gnu.org [online], 2006 [retrieved Jul. 22, 2013], Retrieved from Internet: <http://web.archive.org/web/20100514103807/http://www.gnu.org/software/make/manual/make.pdf>, pp. 1-188.*
Anonymous, "Compiling and Installing—Apache HTTP Server," Apache.org [online], 2010 [retrieved Oct. 7, 2014], Retrieved from Internet: <URL: https://web.archive.org/web/20100323210827/http://httpd.apache.org/docs/2.2/install.html>, pp. 1-5.*

(Continued)

*Primary Examiner* — Todd Aguilera
(74) *Attorney, Agent, or Firm* — Winston Hsu; Scott Margo

(57) ABSTRACT

A method for installing an application program is disclosed. The method includes detecting a system platform, and detecting preprocessing software required by the application program according to the system platform and a compilation script and accordingly generating a relationship file and a log file, wherein the log file includes an acquisition method for the preprocessing software.

8 Claims, 2 Drawing Sheets

(56) References Cited

OTHER PUBLICATIONS

Andrew, "Improve 'Apt-Get Install' and 'Upgrade' Speed [How-To]", Web UPD8 [online], 2009 [retrieved Mar. 4, 2015], Retrieved from Internet: <URL: http://www.webupd8.org/2009/11/improve-apt-get-install-and-upgrade.html>, pp. 1-4.*

Andrew, "Get a List of Packages and Dependencies for Offline Installation [Ubuntu]", Web UPD8 [online], 2009 [retrieved Mar. 4, 2015], Retrieved from Internet: <URL: http://www.webupd8.org/2009/11/get-list-of-packages-and-dependencies.html>, pp. 1-3.*

Anonymous, "AutoDeb", Ubuntu.com [online], 2010 [retrieved Jun. 19, 2015], Retrieved from Internet: <URL: https://wiki.ubuntu.com/AutoDeb>, pp. 1-3.*

Office action mailed on Apr. 9, 2013 for the China application No. 201010185269.3, p. 3 line 5-24.

Zhou Yan-fang et al., "Design and Realization of an Intelligent .NET Release Package", 2004, vol. 7, Application Research of Computers, China Academic Journal Electronic Publishing House, p. 67 left column line 7~44 and right column line 1~3 and p. 68 left column line 13~14, line 49~67 and right column line 1~10.

Office action mailed on Oct. 21, 2013 for the China application No. 201010185269.3, p. 3 line 6~12, line 21~26 and line 30~31 and p. 4 line 1~4.

Office action mailed on Jul. 15, 2013 for the Taiwan application No. 099116098, filing date: May 20, 2010, p. 1 line 12~14, p. 2 line 1~9 and p. 3 line 1~17.

* cited by examiner

METHOD AND DEVICE FOR PROGRAM INSTALLATION

BACKGROUND OF THE INVENTION

1. Field of the Invention

The present invention is related to a program installation method and device, and more particularly, to a program installation method and device for actively providing an acquisition method for preprocessing software.

2. Description of the Prior Art

UNIX and LINUX operating systems are characterized by stability, low price and support for multiple users, and are generally employed in servers. Since UNIX and Linux operating systems can run for more than one year without rebooting, the industry particularly employs the UNIX and Linux operating systems as platforms for software program development and circuit layout.

For example, in a UNIX or LINUX operating system, a program designer can input a "make" instruction to compile thousands of source code sets into several installation modules when installing an application program. When compiling the source code sets, a compilation program refers to a "shell" script which generates file dependency, a compilation order and an installation order (recorded in a makefile file) based on the employed system platform. As a result, the installed application program can be customized according to the system platform.

In general, to access full functions of the application program, preprocessing software corresponding to the application program has to be installed first. For example, multimedia broadcasting programs such as a flash player have to be installed, and then videos can be viewed in a browser. As to the UNIX or LINUX operating system, the compilation program detects the system platform and detects whether an essential program required by the application program is installed according to the shell script when compiling the application program. If the essential program is not installed, the compilation program stops compiling, and informs a user. Only if the essential program is installed can the shell script be completely executed and then generate the makefile file recording dependencies among the source code sets, the compilation order and the installation order. However, when the compilation program detects a preprocessing program which is not essential to the application program in the system platform, the compilation program continues to execute the shell script, and merely records information of the unessential preprocessing program in a log file and removes functions corresponding to the unessential preprocessing program from the application program (not compiled into the installation modules). The most troublesome situation is that help messages about the uninstalled unessential preprocessing program are poorly recorded in the log file, and therefore even professional software programmers spend a huge amount of effort searching through the help messages. That is, when the compilation is completed, the user still has a hard time knowing whether the application programs have fully completed or only essential functions. Even if the user attempts to install the unessential preprocessing program manually, help messages are hard to find and read from the log file.

Therefore, improving compilation interfaces of the UNIX and LINUX operating systems to enhance program development efficiency has been a major focus of the industry.

SUMMARY OF THE INVENTION

It is therefore a primary objective of the claimed invention to provide a method and device for program installation.

The present invention discloses a method for installing an application program. The method comprises detecting a system platform, and detecting preprocessing software required by the application program according to the system platform and a compilation script and accordingly generating a relationship file and a log file, wherein the log file records an acquisition method for the preprocessing software.

The present invention further discloses a program installation device for interactively installing an application program. The program installation device comprises a microprocessor, and a memory for storing an installation program utilized for indicating the microprocessor to perform the following steps: detecting a system platform, and detecting preprocessing software required by the application program according to the system platform and a compilation script and accordingly generating a relationship file and a log file, wherein the log file records an acquisition method for the preprocessing software.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
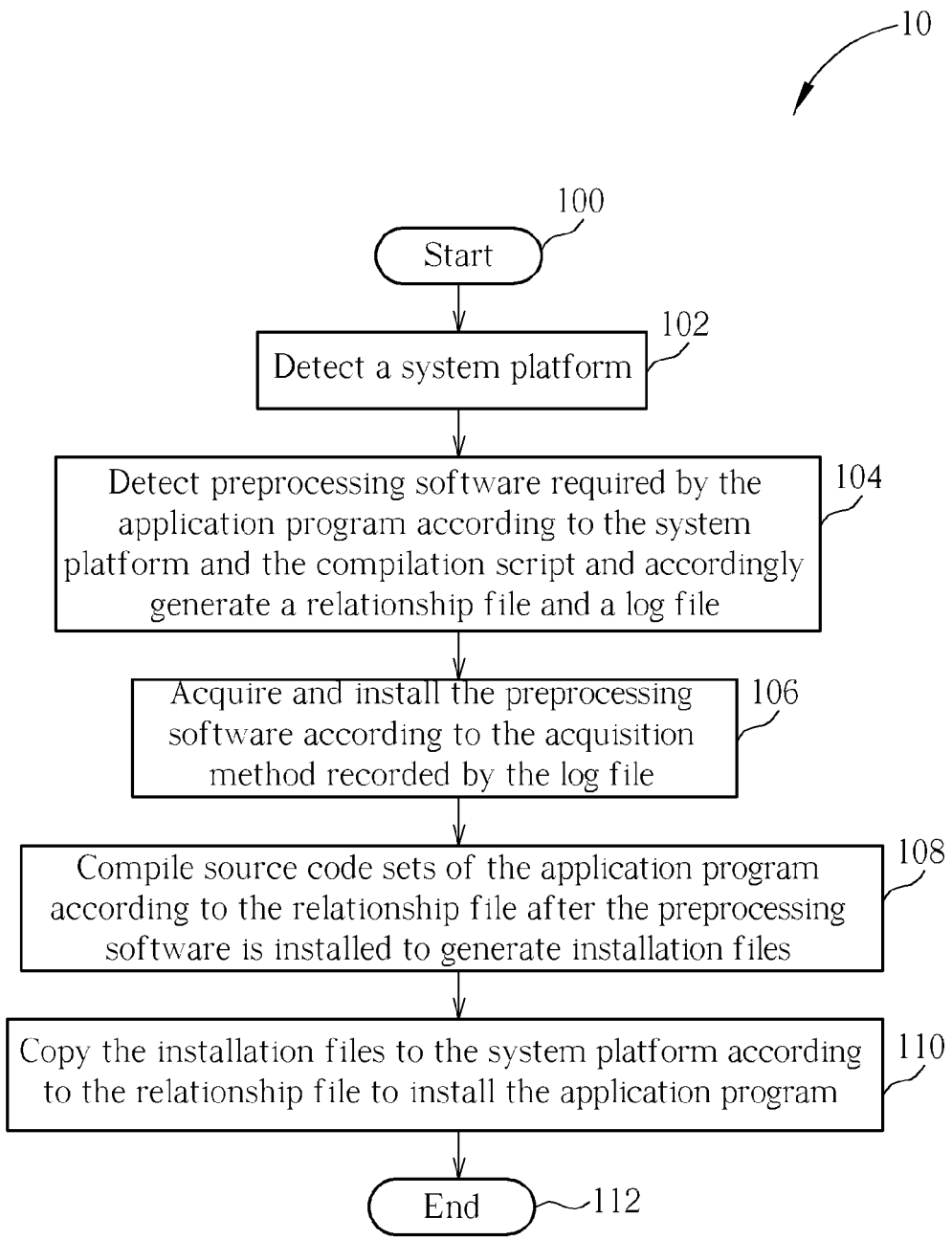
FIG. 1 is a schematic diagram of a program installation process according to an embodiment of the present invention.

To improve compilation interfaces of conventional UNIX and LINUX operating systems, an acquisition method, e.g. a download address, for preprocessing software required when installing an application program is added to a compilation script, e.g. a shell script of the UNIX/LINUX system, to reduce program development time. Please refer to FIG. 1, which is a schematic diagram of a program installation process 10 according to an embodiment of the present invention. The program installation process 10 is utilized for installing an application program, and includes the following steps:

Step 100: Start.

Step 102: Detect a system platform.

Step 104: Detect preprocessing software required by the application program according to the system platform and the compilation script and accordingly generate a relationship file and a log file.

Step 106: Acquire and install the preprocessing software according to the acquisition method recorded by the log file.

Step 108: Compile source code sets of the application program according to the relationship file after the preprocessing software is installed to generate installation files.

Step 110: Copy the installation files to the system platform according to the relationship file to install the application program.

Step 112: End.

In short, according to the program installation process 10, the acquisition method for the preprocessing software is written in the log file by amending the compilation script, such that a user can quickly find help messages from the log file and install the preprocessing software.

In detail, since the preprocessing software includes an essential program and a recommended program (optional to the application program), the acquisition method includes uniform resource locator (URL) addresses for downloading the essential program and the recommended program or other acquisition information. In addition, the relationship file records dependencies among the source code sets, a compilation order and an installation order as reference for the following compilation and installation operations. Note that, the relationship file of the UNIX and LINUX operating system is a "makefile" file which is well known to those skilled in the art and not further narrated herein.

Figure 2:
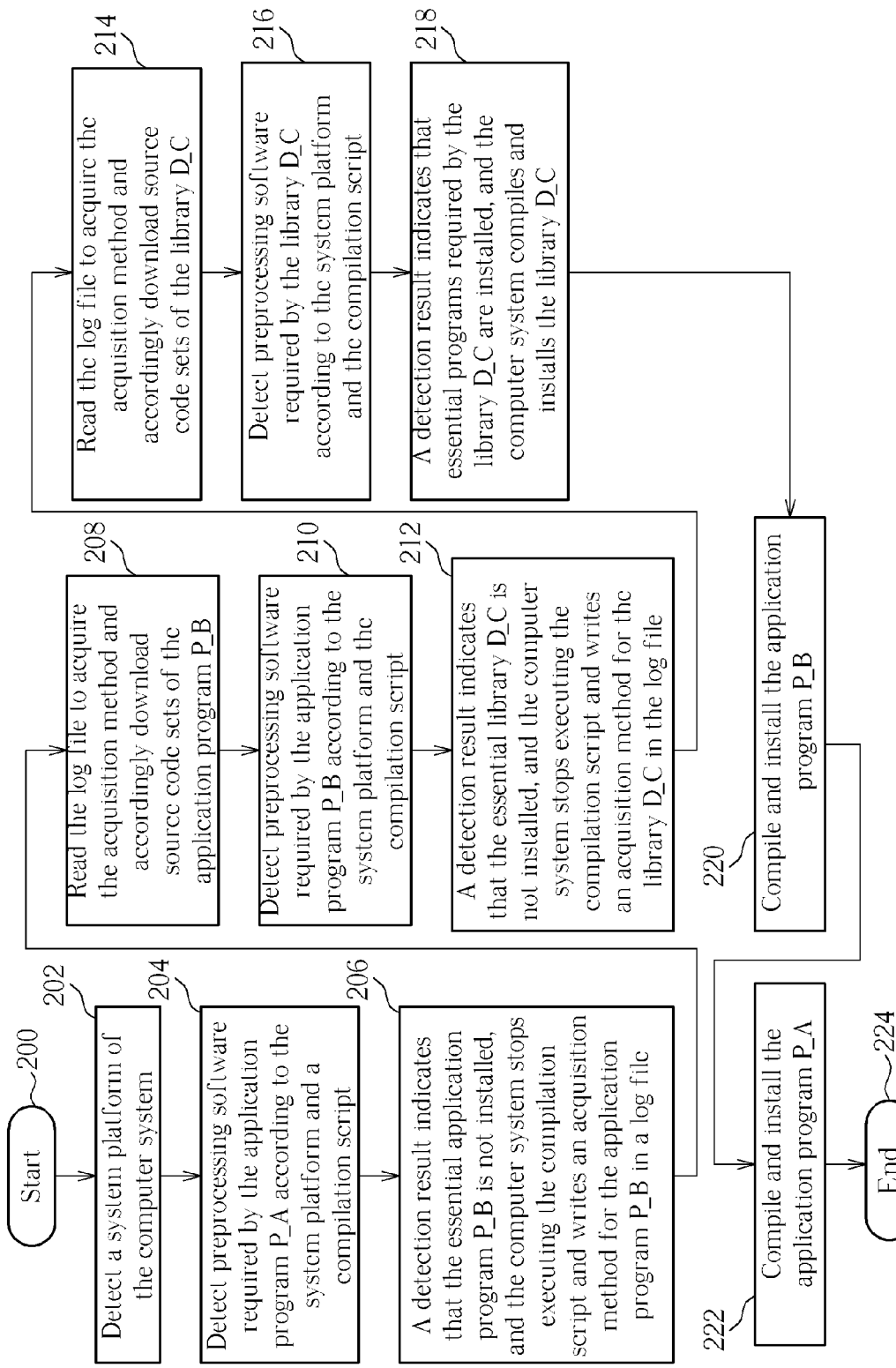
FIG. 2 is a schematic diagram of a process that a computer system automatically installs an application program according to an embodiment of the present invention.

Other than manual operations, e.g. the user judging installation statuses of the preprocessing software based on the log file, manually downloading and installing the preprocessing software, the program installation process 10 can be completely executed by a computer system. That is, the computer system automatically extracts the URL addresses from the log file, and accordingly downloads and installs the preprocessing software. For example, please refer to FIG. 2, which is a schematic diagram of a process by which a computer system automatically installs an application program P_A according to an embodiment of the present invention. In FIG. 2A, an application program P_B is an essential program required by the application program P_A, and a library D_C is an essential program required by the application program P_B. In this case, the computer system executes the following steps:

Step 200: Start.

Step 202: Detect a system platform of the computer system.

Step 204: Detect preprocessing software required by the application program P_A according to the system platform and a compilation script.

Step 206: A detection result indicates that the essential application program P_B is not installed, and the computer system stops executing the compilation script and writes an acquisition method for the application program P_B in a log file.

Step 208: Read the log file to acquire the acquisition method and accordingly download source code sets of the application program P_B.

Step 210: Detect preprocessing software required by the application program P_B according to the system platform and the compilation script.

Step 212: A detection result indicates that the essential library D_C is not installed, and the computer system stops executing the compilation script and writes an acquisition method for the library D_C in the log file.

Step 214: Read the log file to acquire the acquisition method and accordingly download source code sets of the library D_C.

Step 216: Detect preprocessing software required by the library D_C according to the system platform and the compilation script.

Step 218: A detection result indicates that essential programs required by the library D_C are installed, and the computer system compiles and installs the library D_C.

Step 220: Compile and install the application program P_B.

Step 222: Compile and install the application program P_A.

Step 224: End.

As illustrated in FIG. 2, regardless of how many preprocessing programs and next level preprocessing programs induced by the preprocessing programs have to be installed, all preprocessing programs can be hierarchically and systematically installed. Certainly, FIG. 2 merely illustrates a simple case of program installation. In practice, preprocessing programs required when installing an application program are numerous, and the preprocessing programs require even more preprocessing programs to complete the installation. Therefore, the program installation process 10 executed by a computer system can effectively reduce program development time especially when determining installation statuses of the preprocessing software according to the log file.

Other than automatic program installation, the present invention additionally modifies installation configurations to allow the user to choose to automatically install all recommended programs or merely install the essential programs.

As to hardware implementation, the program installation process 10 can be converted to a program through software or firmware and stored in a memory to instruct a microprocessor to execute Steps 100-112. Such a conversion process is well known to those skilled in the art and not further narrated herein.

In the prior art, the user determines the installation statuses of the preprocessing software required when installing the application program merely by studying the log file. Even if the application program is successfully installed, the user still has to study the log file to determine whether the installed application program has full functions. Since the log file is too complex to read, the user wastes a lot of time to determine the installation statuses of the preprocessing software. If the preprocessing programs are numerous, program development efficiency is encumbered with recursive and complicated determination processes. In comparison, the present invention directly adds the acquisition method for the preprocessing software to the compilation script, such that the user can quickly determine the installation statuses of the preprocessing software based on the log file. In addition, the program installation process 10 can be completely executed by the computer system. That is, installation of the preprocessing programs and further induced preprocessing programs can be instantly completed. In case the preprocessing programs are numerous, the automatic program installation process 10 can effectively reduce compilation and installation time to enhance program development efficiency.

To sum up, the present invention provides the acquisition method for the preprocessing software required by the application program in the log file to help the user or the computer system to determine the installation statuses of the preprocessing software more efficiently, so as to enhance the program development efficiency.

Those skilled in the art will readily observe that numerous modifications and alterations of the device and method may be made while retaining the teachings of the invention.

What is claimed is:

1. A method for installing an application program, the method comprising:

an installing device detecting a system platform;

the installing device automatically determining preprocessing software for the application program and detecting the preprocessing software according to the system platform and a compilation script, wherein the compilation script comprises an acquisition method of the preprocessing software;

the installing device generating a relationship file and a log file according to the compilation script, and writing the acquisition method of the preprocessing software into the log file according to the compilation script when the preprocessing software is detected to be not installed yet, wherein the preprocessing software comprises an essential program and a recommended program, the essential program is required to install the application program, and the recommended program is optional to install the application program; and the installing device acquiring the preprocessing software according to the acquisition method written in the log file and installing the preprocessing software;

wherein the acquisition method comprises uniform resource locator (URL) addresses for downloading the essential program and the recommended program of the preprocessing software.

2. The method of claim 1, wherein the relationship file is utilized for recording dependencies among at least one source code set of the application program, a compilation order and an installation order.

3. The method of claim 1 further comprising:

the installing device compiling at least one source code set of the application program according to the relationship file after the preprocessing software is installed to generate at least one installation file; and the installing device copying the at least one installation file to the system platform according to the relationship file to install the application program.

4. The method of claim 1, further comprising determining whether to automatically install the recommended program according to a user's decision.

5. A program installation device for interactively installing an application program, the program installation device comprising:

a microprocessor; and a memory, for storing an installation program utilized for instructing the microprocessor to perform the following steps:

detecting a system platform;

automatically determining preprocessing software for the application program and detecting the preprocessing software according to the system platform and a compilation script, wherein the compilation script comprises an acquisition method of the preprocessing software;

generating a relationship file and a log file according to the compilation script, and writing the acquisition method of the preprocessing software into the log file according to the compilation script when the preprocessing software is detected to be not installed yet, wherein the preprocessing software comprises an essential program and a recommended program, the essential program is required to install the application program, and the recommended program is optional to install the application program; and acquiring the preprocessing software according to the acquisition method written in the log file and installing the preprocessing software;

wherein the acquisition method comprises uniform resource locator (URL) addresses for downloading the essential program and the recommended program of the preprocessing software.

6. The program installation device of claim 5, wherein the relationship file is utilized for recording dependencies among at least one source code set of the application program, a compilation order and an installation order.

7. The program installation device of claim 5, wherein the installation program is further utilized for instructing the microprocessor to perform the following steps:

compiling at least one source code set of the application program according to the relationship file after the preprocessing software is installed to generate at least one installation file; and copying the at least one installation file to the system platform according to the relationship file to install the application program.

8. The program installation device of claim 5, wherein the installation program is further utilized for instructing the microprocessor to perform the following steps:

determining whether to automatically install the recommended program according to a user's decision.

* * * * *